US006757408B2

(12) United States Patent
Houvener

(10) Patent No.: US 6,757,408 B2
(45) Date of Patent: Jun. 29, 2004

(54) QUALITY ASSURANCE AND TRAINING SYSTEM FOR HIGH VOLUME MOBILE IDENTITY VERIFICATION SYSTEM AND METHOD

(76) Inventor: Robert C. Houvener, 9 Blueberry La., Nashua, NH (US) 03062

( * ) Notice: Subject to any disclaimer, the term of this patent is extended or adjusted under 35 U.S.C. 154(b) by 97 days.

(21) Appl. No.: 10/236,785

(22) Filed: Sep. 6, 2002

(65) Prior Publication Data

US 2004/0052404 A1 Mar. 18, 2004

Related U.S. Application Data

(63) Continuation-in-part of application No. 10/058,198, filed on Jan. 25, 2002.

(51) Int. Cl.[7] .................................................. G06K 9/00

(52) U.S. Cl. ..................... 382/115; 340/5.53; 340/5.83; 434/155

(58) Field of Search ......................... 382/115–118, 124, 382/209, 218, 224, 278, 305, 311; 340/5.1–5.2, 5.33, 5.5, 5.52, 5.53, 5.81, 5.82, 5.83; 347/77; 902/1, 3, 5, 6; 434/155; 345/705, 716, 727, 728, 864

(56) References Cited

U.S. PATENT DOCUMENTS

| | | | | | |
|---|---|---|---|---|---|
| 4,805,223 | A | * | 2/1989 | Denyer | 382/127 |
| 5,657,389 | A | | 8/1997 | Houvener | 713/186 |
| 5,790,674 | A | | 8/1998 | Houvener et al. | 713/185 |
| 5,832,464 | A | * | 11/1998 | Houvener et al. | 705/45 |
| 5,991,429 | A | | 11/1999 | Coffin et al. | 382/118 |
| 6,016,476 | A | * | 1/2000 | Maes et al. | 705/1 |
| 6,016,480 | A | | 1/2000 | Houvener et al. | 705/21 |
| 6,018,739 | A | | 1/2000 | McCoy et al. | 707/102 |
| 6,032,137 | A | | 2/2000 | Ballard | 705/75 |
| 6,038,334 | A | | 3/2000 | Hamid | 382/124 |
| 6,040,783 | A | | 3/2000 | Houvener et al. | 340/5.53 |
| 6,070,141 | A | | 5/2000 | Houvener et al. | 705/1 |
| 6,072,894 | A | | 6/2000 | Payne | 382/118 |
| 6,111,977 | A | | 8/2000 | Scott et al. | 382/124 |
| 6,119,096 | A | | 9/2000 | Mann et al. | 705/5 |
| 6,202,055 | B1 | | 3/2001 | Houvener et al. | 705/44 |
| 6,289,113 | B1 | | 9/2001 | McHugh et al. | 382/117 |
| 6,311,272 | B1 | | 10/2001 | Gressel | 713/186 |
| 6,317,544 | B1 | | 11/2001 | Diehl et al. | 382/115 |
| 6,496,595 | B1 | | 12/2002 | Puchek et al. | 382/124 |
| 2003/0120934 | A1 | * | 6/2003 | Ortiz | 713/186 |

OTHER PUBLICATIONS

Bigun et al., Multimodal Biometric Authentication using Quality Signals in Mobile Communications, Sep. 17–19, 2003, 12 International Conference on Image Analysis and Processing, 2003, Proceedings, pp. 2–11.*

* cited by examiner

*Primary Examiner*—Timothy M. Johnson
(74) *Attorney, Agent, or Firm*—McLane, Graf, Raulerson & Middleton, P.A.

(57) ABSTRACT

A security identification system is disclosed for providing information regarding subjects to be identified. The system includes a biometric data input unit for receiving biometric data regarding a subject at a remote location, a biometric analysis unit, and a quality assurance unit. The biometric analysis unit is for analyzing the biometric data and comparing it against known biometric data in a database at a central facility. The biometric analysis unit is also for providing match data that is indicative of whether a match exists and whether the match is above a certain correlation threshold. The quality assurance unit is for permitting quality assurance personnel at the central facility to monitor interactions of a screener and a subject at the remote location.

28 Claims, 10 Drawing Sheets

QUALITY ASSURANCE AND TRAINING SYSTEM FOR HIGH VOLUME MOBILE IDENTITY VERIFICATION SYSTEM AND METHOD

CROSS-REFERENCE TO RELATED APPLICATION

This application is a continuation-in-part application of U.S. application Ser. No. 10/058,198 filed Jan. 25, 2002, now pending.

TECHNICAL FIELD

The present invention relates to the field of security identification systems, and relates in particular to systems and methods for verifying the identity of persons in high volume screening applications.

BACKGROUND OF THE INVENTION

Conventional systems for verifying the identity of persons typically involve either the use of highly skilled screening personnel at a large number of screening points, or involve the use of biometric analysis systems. The use of a large number of highly skilled screening personnel that compare photographic identification documents or cards with the face of the person whose identification is being verified is difficult and expensive to achieve since each screener must be highly skilled in complex personal identification techniques. The use of poorly trained screening personnel presents a dangerous false sense of security. Moreover, even with highly skilled screeners, inconsistencies between procedures used by different screeners may present further difficulties.

The use of biometric analyses standardizes and automates much of the process, but applications using biometric analyses suffer from shortcomings as well. For example, many biometric analysis systems require some human interpretation of the data to be certain in a high percentage of cases, and this interpretation may vary. Moreover, the process of obtaining reliable and consistent biometric information from a large number of persons to be identified remains difficult due to biometric data capturing concerns, particularly with non-contact biometric data capturing. Certain conventional non-contact biometric data capturing systems use video cameras to capture the faces of people in a subject area, or employ non-contact sensors to capture characteristics of parts of a person's body. Such systems, however, remain inconsistent and insufficiently reliable, at least in part due to variations in how the subject is presented to the video camera or sensor. For facial recognition, poor lighting and poor pose angles present significant difficulties. Difficulties are also presented by having a moving subject with a fixed camera view area, particularly if the subject's face occupies a small portion of a large and highly varying view area. Other non-contact biometric techniques include iris scanning, which requires that each subject walk up to a capture device, align themselves correctly and have their iris scanned and verified. Contact based biometric systems, such as finger print readers, are generally considered to be less safe from a health standpoint due to having a large number of persons touch the same device over a long period of time.

For example, U.S. Pat. No. 6,119,096 discloses a system and method for automated aircraft boarding that employs iris recognition. The system, however, requires that each passenger be initially enrolled and scanned into the system. U.S. Pat. No. 6,018,739 discloses a distributed biometric personal identification system that uses fingerprint and photographic data to identify individuals. The system is disclosed to capture biometric data at workstations and to send it to a centralized server via a wide area telecommunications network for automated processing. Similarly, U.S. Pat. No. 6,317,544 discloses a distributed mobile biometric identification system with a centralized server and mobile workstations that uses fingerprint and photographic data to identify individuals. The system is disclosed to capture biometric data at workstations and to send it to a centralized server via a wireless network for automated processing. Each of these systems, however, may produce false positive identifications (which may overwhelm a review system) or miss certain identifications due to uncertainties in biometric data capture and/or analysis as discussed above.

There is a need, therefore, for an efficient and economical system and method that provides improved personal identity verification for a large number of persons in a high volume environment.

SUMMARY OF THE INVENTION

A security identification system is disclosed for providing information regarding subjects to be identified. In accordance with an embodiment, the system includes a biometric data input unit for receiving biometric data regarding a subject at a remote location, a biometric analysis unit, and a quality assurance unit. The biometric analysis unit is for analyzing the biometric data and comparing it against known biometric data in a database at a central facility. The biometric analysis unit is also for providing match data that is indicative of whether a match exists and whether the match is above a certain correlation threshold. The quality assurance unit is for permitting quality assurance personnel at the central facility to monitor interactions of a screener and a subject at the remote location.

BRIEF DESCRIPTION OF THE DRAWINGS

The following description may be further understood with reference to the accompanying drawing in which.

The drawings are shown for illustrative purposes.

DETAILED DESCRIPTION OF THE INVENTION

The present invention provides for systems and methods for optimally gathering biometric data and documentation data regarding individuals whose identity is to be verified in high volume screening applications. In an embodiment, the method involves the use of face to face human interaction to set up and execute scripted scenarios for operators (screeners) to follow, ensures that optimal quality data is captured in a highly consistent manner. The collection method is driven by the voice of the screener as part of the normal conversation with the person being screened. The screener is queued by an interactive teleprompter on a miniature screen display. In the case of ambiguous biometric results, the system invokes a live identification expert with access to auxiliary data to assist the field-based screener via live text, audio and video. The method provides significant improvement in biometric performance and improves screening efficiency. The system also provides interactive training of screening personnel in an embodiment based on their on-going performance.

Figure 1:
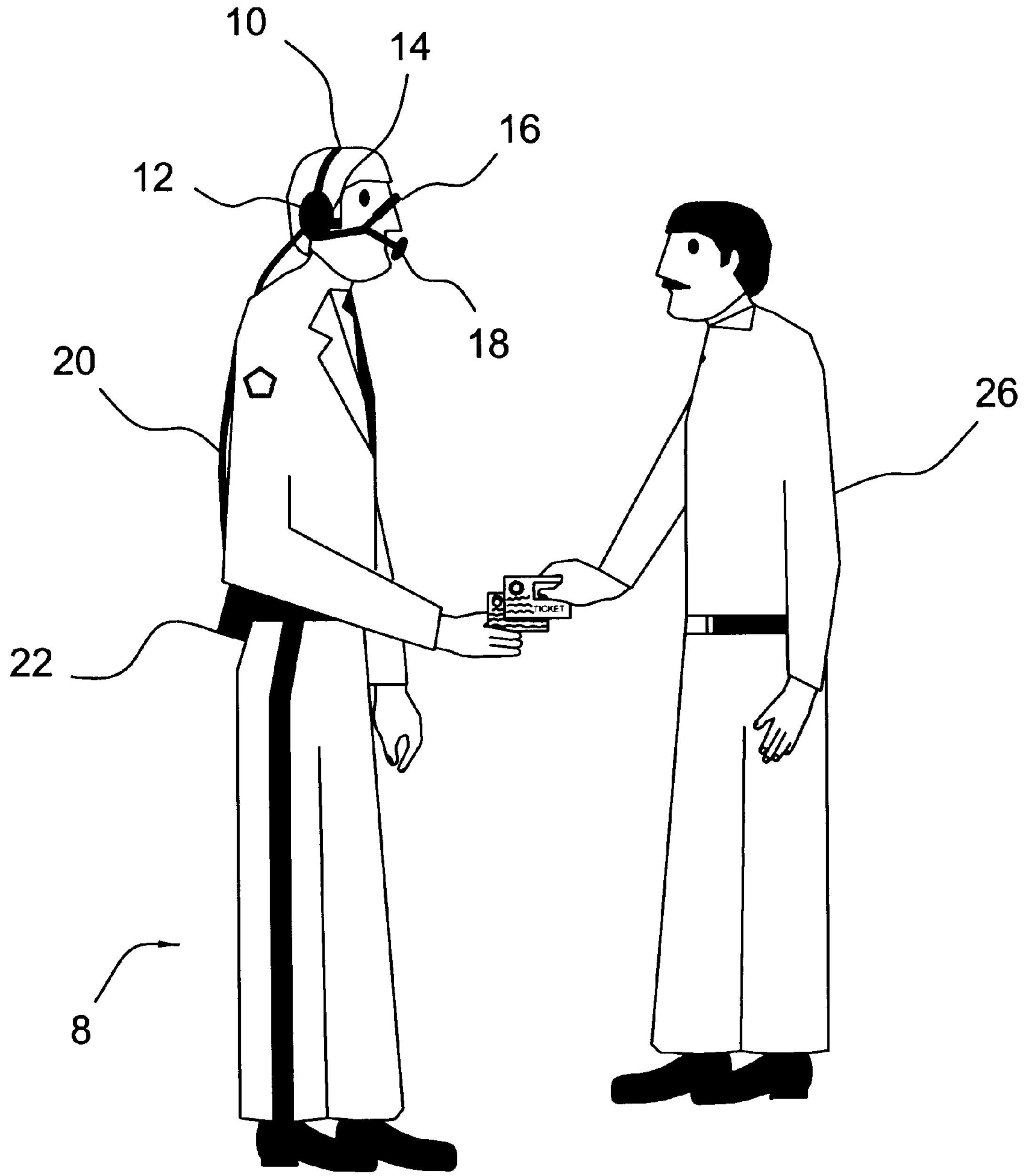
FIG. 1 shows an illustrative view of a screener using a system in accordance with an embodiment of the invention to screen a subject.
Figure 2:
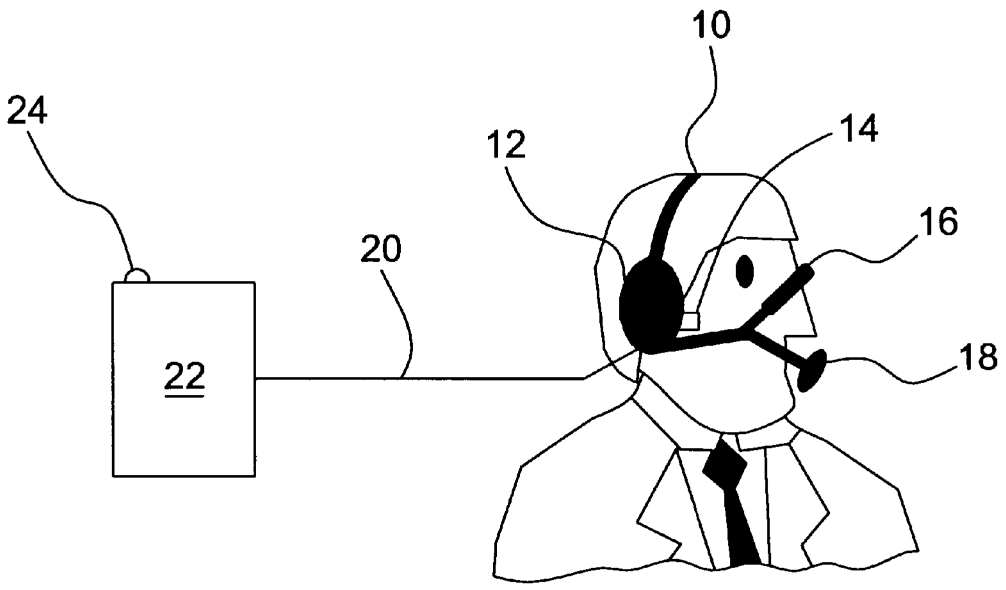
FIG. 2 shows an illustrative enlarged view of the screener of FIG. 1 wearing a data collection unit in accordance with the system shown in FIG. 1.
Figure 3:
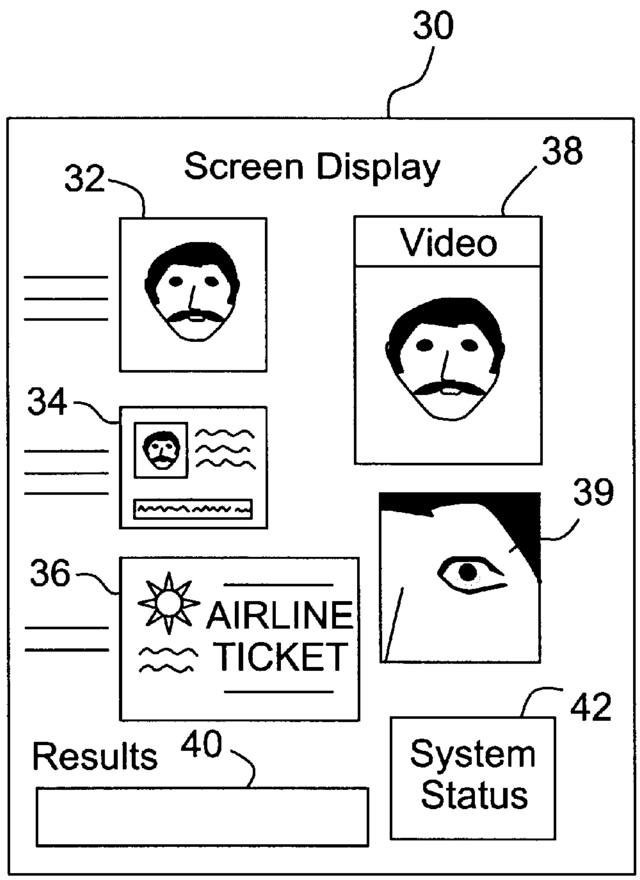
FIG. 3 shows an illustrative view of a screen display as seen by a screener in accordance with an embodiment of the invention.

As shown in FIG. 1, in accordance with an embodiment of the invention, a screener 8 may wear a specialized data collection and display device 10 that includes an earphone 12, a camera 14, a micro display 16, and a microphone 18. The camera 14 is a miniature high resolution color or grayscale camera. The micro display 16 is a miniature high resolution color/grayscale display that is viewable only by the screener, such as those sold by MicroOpical Corporation of Westwood, Mass. The display may project an image into space in front of the screener's face (again viewable only by the screener). As also shown in FIG. 2, the device 10 is connected via a cable 20 to a small computer 22, which in turn communicates via an antenna 24 and a high speed wireless connection to a central analysis facility. The computer 22 may be worn by a screener on a waist belt out of view of the person being screened 26. In further embodiments, the devices 10 may be made even smaller, with each communication device fitting on a single pair of eyeglasses so as to fully minimize the impact on the subject 26 and permit natural interaction between the screener 8 and subject 26. Each device 10 is personalized at the time of use to a particular authorized screener. All communications with the central analysis facility are encrypted. The device application software includes two way voice, text (from the central facility) and two way video and still image capture/display, as well as local biometric data, compression, control and communication capabilities. The device 10 is completely driven by the voice of the screener for all real-time functions via keyword spotting that is tied to the main screening script as discussed in more detail below. The miniature display 16 may provide a significant amount of information in the form of a screen display 30 as shown in FIG. 3, including a photograph 32 of the subject 26, a photograph of the subject's identification card (ID) 34, a photograph of the subject's airline ticket 36, a streaming video image 38, and an image of an eye 39 for, e.g., iris scanning or retinal imaging. In certain embodiments, the camera 14 may have sufficient resolution to locate the one or both eyes in the image of the subject's face, and increase the scale of the eye to fill the viewing image to create the image 39 for processing. The display may also provide a results field 40 and a system status field 42, and may further include text accompanying any of the various photographs or images as shown, as well as text generated from remote locations.

All devices 10 are connected in real time to one or more analysis facilities via standard high-speed commercial telecommunications providers. The analysis facility includes strong authentication and firewalls for incoming and outgoing communications. It contains a very high speed local area network (LAN)/storage area network (SAN) system, connecting database and analysis servers to devices 10 and to human analysts and quality control personnel. The analysis servers include generalized correlation engines, biometric correlation engines, as well as other automated support for screener based devices, in addition to local analysts supporting screeners in the field. Also at these facilities are automated on-line training/screening performance metrics servers. The secure facilities may be run under United States Department of Defense security standards and may be staffed with fully security cleared operators, particularly at the expert analysts workstations. These workstations are provided with real time connection to the screening process, both locally and out to the screeners via voice, image, video and text communication. The analysis facility has local copies of known threat data, as well as secure connectivity to appropriate governmental agencies. The system combines real time access to experts with the least traveler inconvenience or impact. The system may be used, for example at airports during check-in, gate-entry-screening, boarding, or baggage claim. In further embodiments, the system may be used in a wide variety of environments where the accurate and rapid identification of individuals is required such as any secure entry or access facility.

Figure 4:
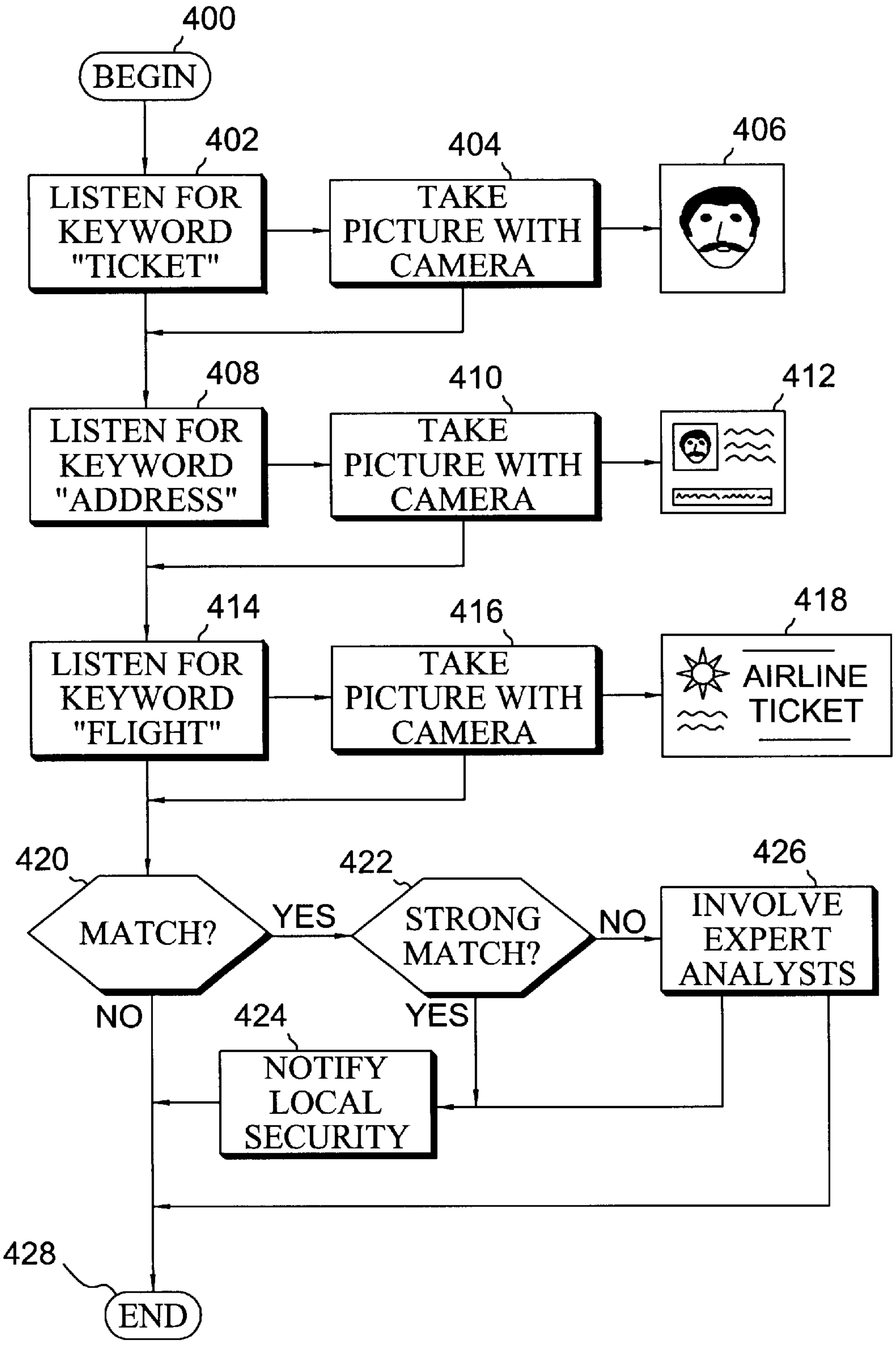
FIG. 4 shows an illustrative flowchart of the operation of a system in accordance with an embodiment of the invention.

With reference to FIG. 4, the system begins (step 400) when a subject to be screened walks up to a screener at, for example, an airline ticket counter at an airport or an airline gate screening security station. In various embodiments, the screener may be required to log in and verify their own identity via the biometric analysis system. As shown in FIG. 4, during operation the screener follows a script and looks directly at the subject and asks to see the subject's ticket. When the system hears the screener say the word "ticket" (step 402) it takes a picture of whatever the screener is looking at at that moment. The image 406 of the subject that is taken by the camera will be a close up picture in full view of the subject's face and/or eye from a front-on direction. The screener should be trained to not say the word "ticket" until the subject is looking at the screener. In various embodiments, the system may permit the picture to be retaken if the subject fails to look toward the screener by again stating the word "ticket" or by recognizing some other pre-arranged command, such as "look at me, please" if necessary. The image 406 is recorded by the computer 22. In further embodiments, the system may also automatically request that the screener re-take a picture, for example, if the biometric processing results in an ambiguity.

The screener then asks for some photo-identification, and while looking at the photo-identification the screener asks whether the address on the photo-id is the current address. The system hears the word "address" (step 408) and takes a photograph (step 410) of the photo-id that the screener is looking at. The photograph of the identification card 412 is also recorded by the computer 22. The screener then looks at the ticket and reads the flight information out loud (e.g., "I see that you are on Flight 100 to Washington D.C."). When the system hears the word "flight" (step 414) it takes another picture (step 416), this time of the ticket 418, which is recorded by the computer 22. Each of the pictures 406, 412 and 418 are recorded in seconds, without interrupting the normal flow of passenger interaction. The pictures taken by the camera 14 are shown on the display as illustrated in FIG. 3 at 32, 34 and 36 respectively, and are processed for transmission to the central facility. Biometric analysis may be performed by each computer 22 or preferably sent to the central facility for biometric analysis as well.

Figure 5:
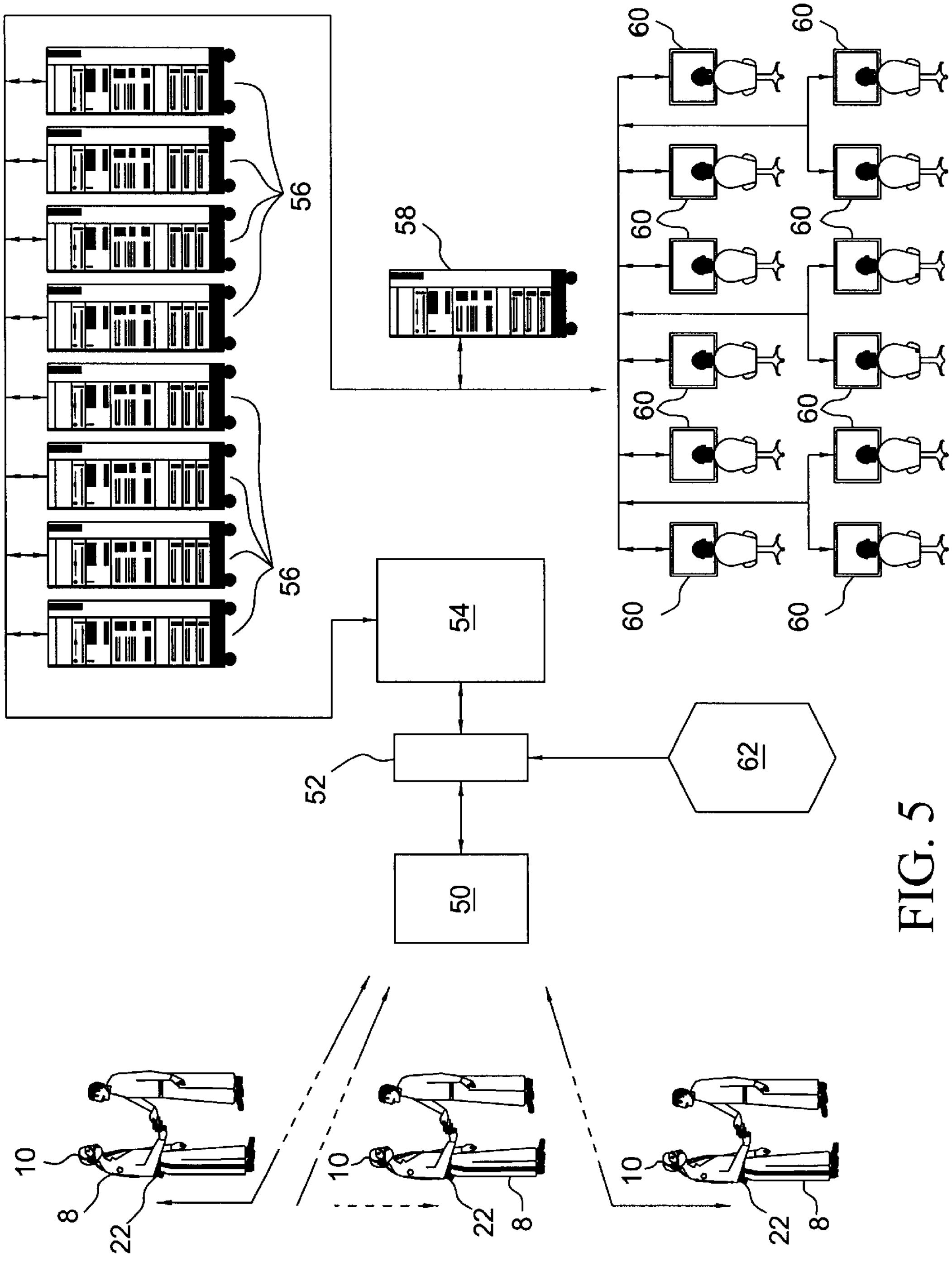
FIG. 5 shows an illustrative diagrammatic view of a system in accordance with an embodiment of the invention.

As shown in FIG. 5, each screener 8 has a data collection device 10 that is attached to a computer 22 that communicates via wireless communication to a central facility (optionally via a local wireless transmitter/receiver station 50). The central facility includes a firewall 52, a central transmitter/receiver station/server 54, and a number of high speed LAN/SAN data storage and analysis processors. The central facility may also include an interactive and automated on-line screener training/performance metric system 58 that monitors the performance of each screener. The analysis processors 56 are also coupled to a bank of analysts work stations 60 for providing real time expert analysis support for the screeners via two way communication. The analysts stationed at the work stations 60 provide backup analysis in the event that the biometrics analysis is not fully satisfactory, and provide question and answer support/training for the screeners. The system may also include access to information from a Federal information link 62 such as to the Federal Bureau of Investigations.

While the ticket and photo-id are being captured, the real-time analysis system at the central facility runs the picture 406 of the subject's face, or a mathematical representation of the face that has been extracted from the picture at either the screener or central site, against the known database of high-risk individuals. If there is no match (step 420) then a message is sent to the screener's device, and the screener receives an indication in field 40 of FIG. 3 that the subject is cleared and free to go. Typical biometric analysis systems employ a variety of test characteristics that together provide a numerical number, e.g., a match of x out of y characteristics. A match is typically defined as a range (m–y) such that numbers in the range (m<x<y) indicate a match. A match is strong if the number x is close to y, and weak if the number x is close to the threshold m.

Referring again to FIG. 4, which illustrates a watchlist application where a subject is being compared to known high risk individuals, if there is a match, the system determines whether or not the match is strong or weak (step 422). If the match is strong (step 422), then the system prompts the screener to not let the subject pass and to contact security immediately (step 424) for further questioning or retention. In certain embodiments, the system may itself contact security immediately to assist the screener. If there is a match at step 420, but the match is weak (step 422), then the system automatically involves one or more experts (step 426) that are stationed at work stations 60 to assist in the analysis. The experts review the images and data in real time, and contact with screener with instructions to either clear the individual or to contact security. The system then ends (step 428) and begins anew with the next subject to be screened. Even if the expert analysts are involved, the screening process should require only seconds to fully execute. The system may also automatically involve one or more experts if the individual with whom a match appears to exist is a known high risk individual regardless of whether the match is strong or weak. When used for verification purposes (i.e., one to one matching as opposed to one to many matching), an index may be collected from the subject as via a barcode. This allows the system to check the current person against their previously enrolled identity.

Figure 6:
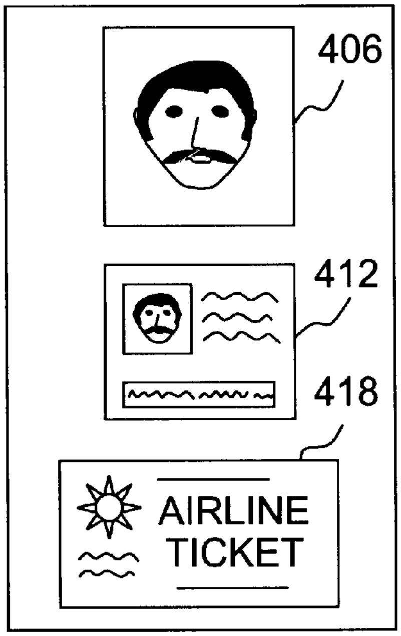
FIG. 6 shows an illustrative view of a packet of information that is communicated from a screener to a central facility in accordance with an embodiment of the invention.
Figure 7:
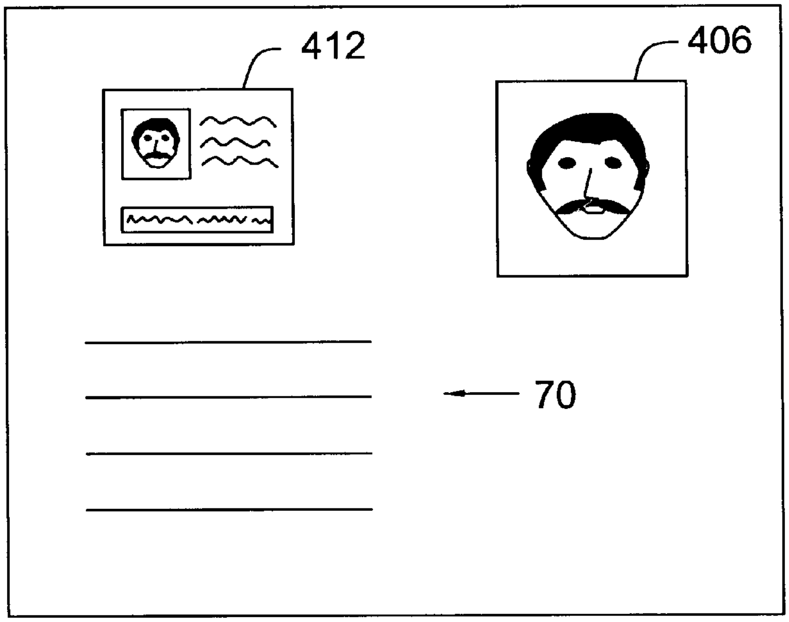
FIG. 7 shows an illustrative view of a screen display as seen by an expert analyst in accordance with an embodiment of the invention.

The system is not required to utilize any single biometric characteristic such as facial recognition, and may be modified to capture and review other biometric information such as voice prints and iris scanning. In any event, the benefits of both biometric analyses and the use of expert analysts in real time significantly improves results for minimal costs. As shown in FIG. 6, the packet of information that is sent to the central facility for any particular subject includes the biometric information as well as copies of the pictures taken of the subject's face 406, photo-id 412 and photograph of the ticket 418. As shown in FIG. 7, each expert analyst station may include the above as well as any pertinent classified information 70 that is available only to the expert analysts.

The present invention provides high quality data capture and screening by leveraging the interaction between screening personnel and people being screened. Biometric data collection devices that are worn by the screener rely on the proximity and voice interaction between the screener and subject to obtain very reliable biometric data. The collection devices also communicate with a central control system for full analysis and reporting of the biometric data.

The visual prompting of the screener, in synchronization with the collection system, yields a systematic, uniform, natural, efficient and optimal data collection process. This increases the likelihood of detecting a known high-risk individual, and minimizes the number of false positive identifications. The system also reduces the required level of skill of the screeners that are in contact with the persons to be identified. Duplicate screeners, in fact, may even be employed at different stations in an airport, such as check-in, gate-entry, boarding and baggage claim. Further, the system may provide a safeguard that ensures that each passenger boarded a plane, that their luggage is on the plane, and that the luggage is later claimed by the correct person.

The real time automated switching of the screening from a totally automated biometric decision process, to an expert-in-the-loop process, allows any false match problems to be handled in an efficient manner. By utilizing experts, false matches may be cleared in seconds and resources may be utilized more efficiently to identify high-risk individuals.

By capturing the biometric data and identification and travel documents at the same time, a complete data set is efficiently and economically captured for each individual. By analyzing these data sets on a per screener basis, it is possible to discern areas of each individual screener's performance that need improvement. The system permits direct communication between the screeners and the experts. By training screeners using systems of the invention, greater efficiency may be achieved in both the screening and training of screeners.

As mentioned above, biometric data acquisition techniques other than facial recognition may also be employed. The easiest system for the subject to interact with is a non-contact biometric system such as facial recognition, where the subject needs only to be within a field of view of the facial recognition camera to have his or her face acquired and analyzed. Another non-contact method is voice verification, where the subject only needs to be within the range of the microphone being used to capture the voice. A drawback, however, of these non-contact biometric data acquisition techniques is that the quality and consistency of the capture may be highly variable. This variability in the captured data, in turn, causes the matching algorithms to have poor performance. Another non-contact biometric technique is iris recognition, which has much less variability in the matching process, but capturing a high quality image is quite difficult due to the small size of the iris. Further, contact based biometrics such as finger imaging, have much less of a problem capturing the appropriate part of the subject even at the proper resolution, but suffer from problems associated with having a large number of people touch the same sensor over an extended period of time, in addition to trying to quickly acquire finger image(s) that are properly aligned.

In accordance with a further embodiment of the invention, an identity verification system may employ a first biometric acquisition and analysis, followed by a secondary biometric acquisition and analysis in certain cases as discussed in more detail below. The secondary biometric information may also be input to the system, and this feedback may permit the primary biometric analysis system to better learn a subject's identity over time and therefore become more efficient.

Figure 8A:
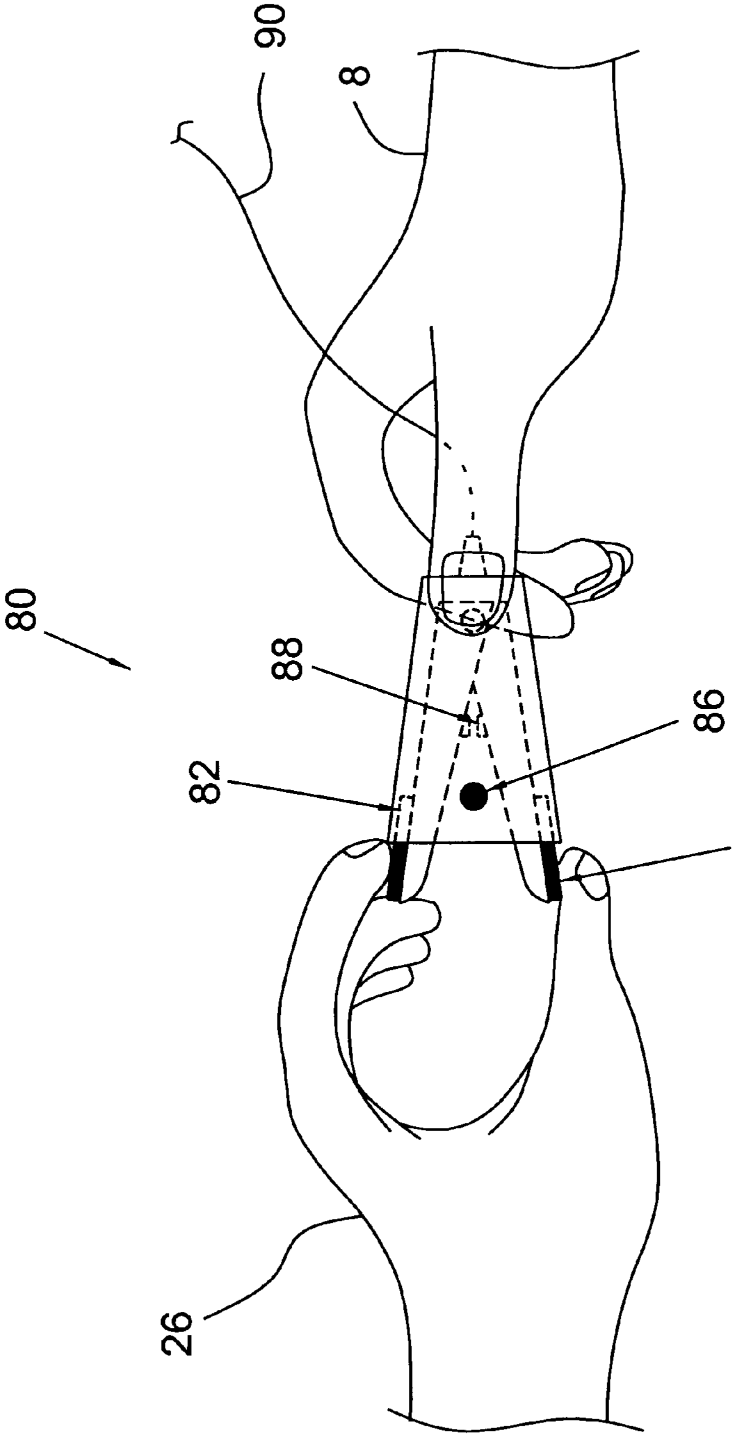
FIGS. 8A–8C show illustrative diagrammatic top, side and end views respectively of a contact biometric system in accordance with an embodiment of the invention.
Figure 8B:
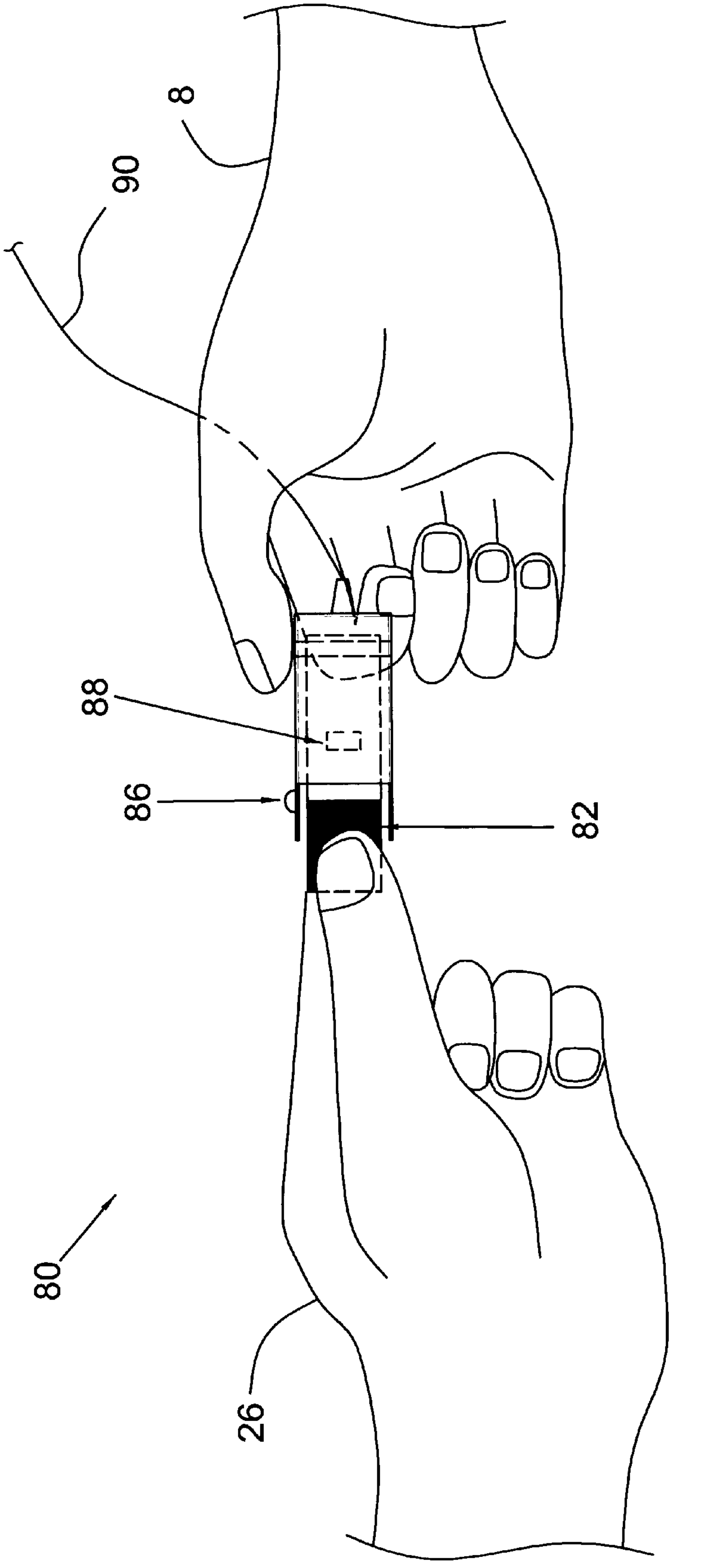
Figure 8C:
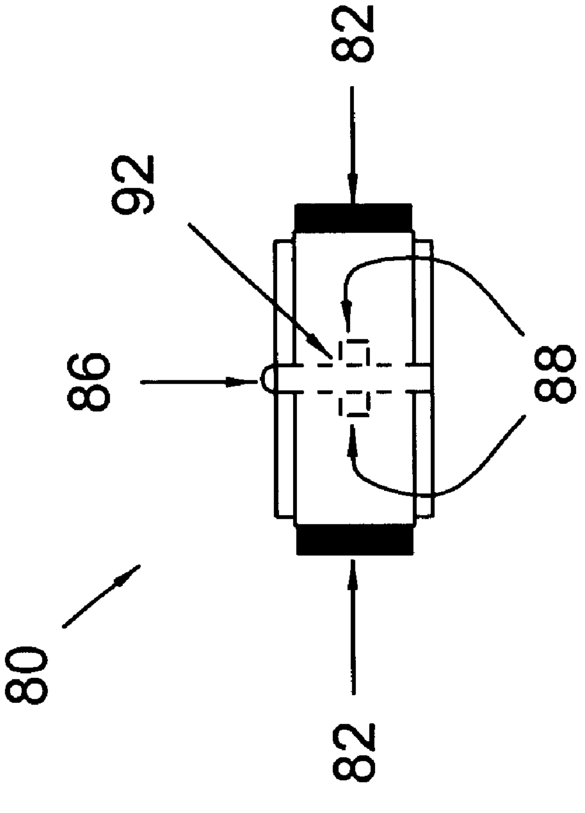

For example a system of the invention may employ a contact biometric data acquisition system such as the fingerprint capture sensor device shown in FIGS. 8A–8C fingerprint capture device 80 includes a pair of fingerprint sensors 82 and 84 mounted on oppositely facing surfaces such that the device may be squeezed by a subject when a subject's thumb and forefinger are placed on the sensors 82 and 84. The device also includes a light source 86 and sensor contacts 86 that indicate that the subject is squeezing the device and thereby firmly pressing the thumb and forefinger against the respective sensors. The sensors are also coupled to a sensor output wire 90 for coupling to a communication system such as that shown in FIGS. 1–7. The sensors record the image that is acquired from the finger, and the light 86 alerts the subject to the status of the capture process. The sensors may employ capacitive, optical or other finger image capture technologies. In a preferred embodiment, the sensors 82 and 84 are relatively inexpensive and easy to replace. This is preferred not only for hygienic reasons, but also to thwart efforts by subjects to damage or alter the sensors.

The device 80 allows for the capture of more than one finger at a time, automatically aligns the fingers with the sensors 82, 84, and further ensures that the correct amount of pressure is applied by the subject. The device permits the sensors to be squeezed (e.g., rotated about a pin 92) against a spring to a stop position, e.g., when the sensor contacts 86 abut one another. The subject is then notified via audio or light that the capture is complete and releases the device. This method permits the collection of correctly positioned finger images and hence leads to better recognition results. Other contact biometric data acquisition sensors may involve sending light through a person's skin to uniquely identify individuals, such as by using the LIGHTPRINT sensor product sold by Lumidigm, Inc. of Albuquerque, N. Mex.

Figure 9A:
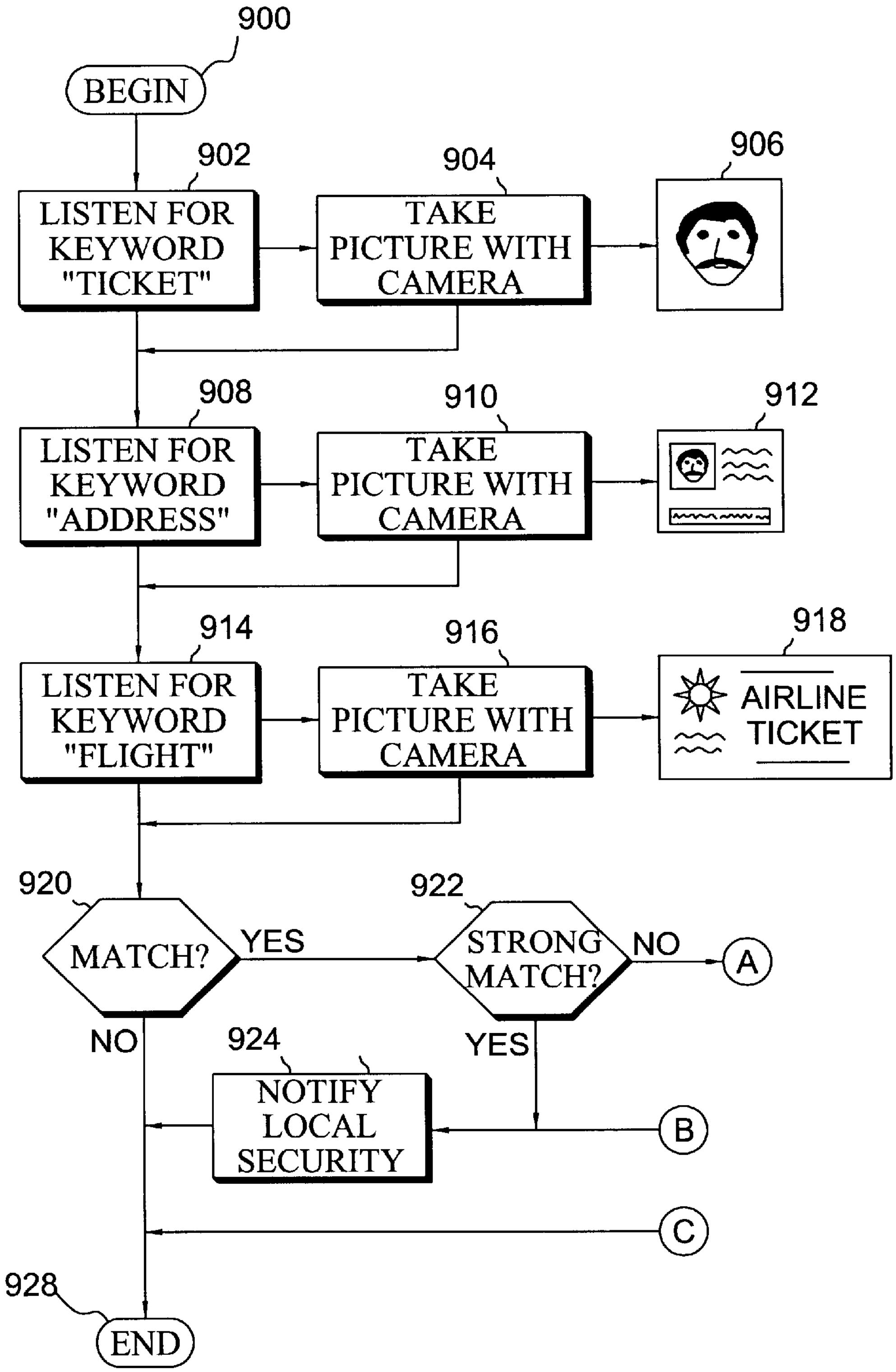
FIGS. 9A and 9B show illustrative flowcharts of the operation of a system in accordance with an embodiment of the invention.
Figure 9B:
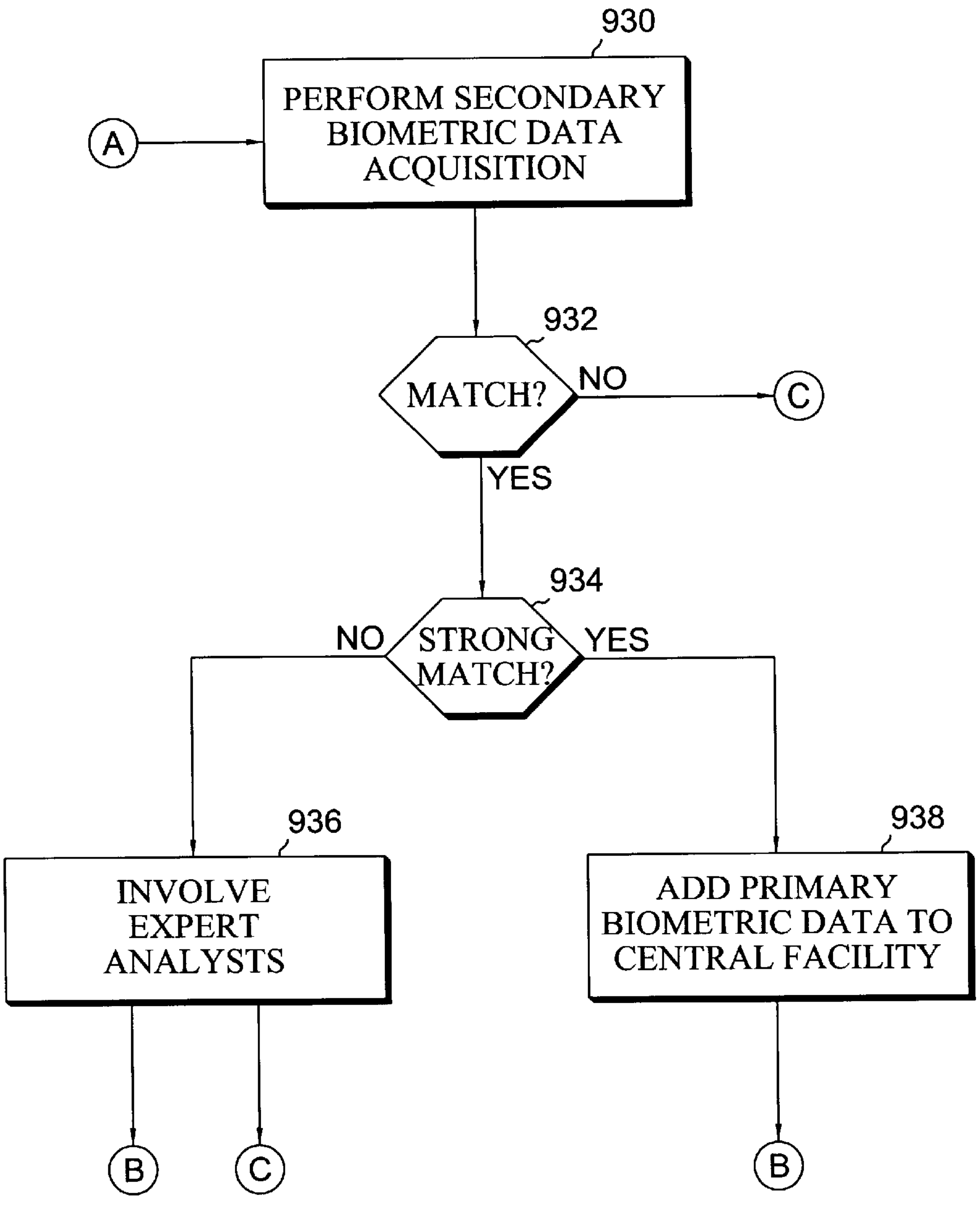

As shown in FIGS. 9A and 9B, a method is accordance with a further embodiment of the invention involves the process of primary biometric data acquisition (steps 900–924) similar to the data acquisition process described above with reference to steps 400–424 of FIG. 4. If the analysis of the biometric data provides a strong match (step 922) then the program directs that the operator is to notify local security (step 924). If, however, the match is not strong (step 922) then the program directs the operator to acquire secondary biometric data as shown in step 930 in FIG. 9B. The secondary biometric data acquisition technique may involve contact biometric data such as by using the finger print capture sensor device 80 shown in FIG. 8. In other embodiments, the secondary biometric data acquisition technique may involve non-contact biometric data acquisition. If there is no match with the secondary biometric data, then the program returns that there was no match and ends (step 928). If there is a match with the secondary biometric data, then the program determines whether the match is a strong match (step 934) similar to the procedure discussed above with respect to the primary biometric data analysis. If the match is not strong, the system may then proceed to invoking the expert analysts at the central facility (step 936) as discussed above with respect to step 426 in FIG. 4. If the secondary biometric analysis provides a strong match, then the system adds the primary set of biometric data to the databases in the central facility (step 938). By adding another set of primary biometric data to the central facility, the system provides helpful feedback with respect to the primary biometric data. This feedback permits the system to learn to better recognize individuals using the primary biometric data, and therefore permits the system to learn as it operates and such learning is independent of the remote computers on each screener or operator. In further embodiments, the system may permit the primary biometric system to learn via neural network feedback. Such feedback may be performed automatically and may further be conducted based on information from the expert analysts—either with or without using the secondary biometric system. Over time, this may considerably improve the performance of the primary biometric system.

The present invention not only optimizes the quality of the captured data presented to biometric algorithms, but it also allows the operator to select the easiest to use biometric that may be used in a given situation. This may allow non-contact biometric acquisition technique to be used in a first pass and a contact or alternate non-contact biometric acquisition technique to be used in a second pass if the first pass biometric does not achieve the desired results due to problems with the collection of the data for the first pass biometric. For example, if the first pass biometric works 90% of the time and takes 5 seconds, and a second pass biometric takes 15 seconds and works for 95% of the 10% that did not work in the first pass, then overall the two passes of biometrics will work for 99.5% of the subjects being verified. Moreover, the average time to complete the biometric data acquisition will be significantly less time than the time required if the secondary biometric acquisition technique was employed all of the time (as the first pass technique). This reduced time produces much shorter queues of subjects being verified, provides better overall customer experience, and much lower costs for screening activities.

As mentioned above, the system permits interactive training of screening personnel based on their on-going performance. Quality assurance may also be improved by using an identity verification system of an embodiment of the invention. In particular, quality assurance personnel may record the complete interaction between a subject and a screener via the wearable computer and upload the interaction to the central facility. The quality assurance personnel may then play back the interaction and evaluate performance. In accordance with an embodiment, the system may provide the capability to immediately react to issues noted by a quality assurance personnel, by allowing the quality assurance personnel to assign an interactive multi-media training module to the field personnel (or screener). The field personnel are then prompted to participate in a training session at the next convenient time, such as when they log into their wearable computer at the start of their next shift. This centralized quality assurance and training capability permits large organizations to assure that their field personnel are providing high quality customer service in a method that is considerably more efficient and effective than sending quality assurance personnel to the field for auditing and training purposes. The quality assurance personnel may collect the field data on a periodic or directed basis and the customer or subject interactions may be recorded via the wearable computer. Such a quality assurance routine may be conducted over an extended period of time for the convenience of the quality assurance personnel and the screeners. For example, the interaction may be automatically uploaded to the central facility at scheduled times, then viewed by a quality assurance person at any later time. After reviewing a transaction, the quality assurance person may select and transmit to the screener a training module (e.g., to improve the quality of pictures being taken by the screener). The screener may then be prompted to run the training module when he or she next signs onto the system. Any initial training may also be similarly conducted without requiring the screener to travel to the central facility.

Those skilled in the art will appreciate that numerous modifications and variations may be made to the above disclosed embodiments without departing from the spirit and scope of the invention.

What is claimed is:

1. A security identification system for providing information regarding subjects to be identified, verified, or both, said system comprising:

biometric data input means for receiving biometric data regarding a subject at a remote location;

biometric analysis means for analyzing said biometric data and comparing it against known biometric data in a database at a central facility, and for determining whether a match exists between said biometric data and said known biometric data; and quality assurance means for permitting quality assurance personnel at the central facility to perform any one or more of:

monitoring interactions of a screener and a subject at the remote location;

providing instructions to a screener at a remote location; and providing feedback to a screener at the remote location.

2. The security identification system of claim 1, further comprising:

said biometric analysis means additionally for determining whether said match between said biometric data and said known biometric data is a strong match; and expert analysis means for automatically providing said biometric data to an analyst workstation when the match is not a strong match.

3. The security identification system of claim 2, further comprising:

security clearance output means coupled to said biometric analysis means and to said expert analysis means for providing an indication of whether the subject is cleared.

4. The security identification system of claim 1, further comprising:

security clearance output means coupled to said biometric analysis means for providing an indication of whether the subject is cleared.

5. The security identification system of claim 1, further comprising:

remote training means for permitting quality assurance and training personnel at the central facility to train a screener at the remote location.

6. The security identification system of claim 1, wherein said biometric data input means includes at least one input device selected from a camera, microphone, iris scanner, and a finger print capture sensor device.

7. The security identification system of claim 1, wherein said biometric data input means includes a camera that may be directed at a subject and a micro display that is viewable only by a screener that is using the biometric data input means.

8. The security identification system of claim 1, wherein said quality assurance means includes capture means for capturing an interaction session between a screener and a subject.

9. The security identification system of claim 1, wherein said quality assurance means includes selection means for permitting quality assurance personnel to select a training module to be sent to a screener.

10. The security identification system of claim 9, wherein said screener may run said training module at said remote location.

11. The security identification system of claim 9, wherein said training module provides an interactive training session using said biometric data input means.

12. The security identification system of claim 1, wherein said known biometric data in said database includes data representations of one or both of:

a watchlist of persons to be identified; and a list of persons for identity verification.

13. A security identification system for providing information regarding subjects to be identified, verified, or both, said system comprising:

a biometric data input device for receiving biometric data regarding a subject at a remote location;

a biometric analysis processor for analyzing said biometric data and comparing it against known biometric data in a database at a central facility, and for determining whether a match exists between said biometric data and said known biometric data; and a quality assurance system for permitting quality assurance personnel at the central facility to perform any one or more of:

monitoring interactions of a screener and a subject at the remote location;

providing instructions to a screener at a remote location; and providing feedback to a screener at the remote location.

14. The security identification system of claim 13, further comprising:

said biometric analysis processor additionally for determining whether said match between said biometric data and said known biometric data is a strong match; and an expert analysis system for automatically providing said biometric data to an analyst workstation when the match is not a strong match.

15. The security identification system of claim 14, further comprising:

a security clearance output system coupled to said biometric analysis processor and to said expert analysis system for providing an indication of whether the subject is cleared.

16. The security identification system of claim 13, further comprising:

a security clearance output system coupled to said biometric analysis processor for providing an indication of whether the subject is cleared.

17. The security identification system of claim 13, further comprising:

a remote training system for permitting quality assurance and training personnel at the central facility to train a screener at the remote location.

18. The security identification system of claim 13, wherein said biometric data input device includes at least one input device selected from a camera, microphone, iris scanner, and a finger print capture sensor device.

19. The security identification system of claim 13, wherein said biometric data input device includes a camera that may be directed at a subject and a micro display that is viewable only by a screener that is using the biometric data input means.

20. The security identification system of claim 13, wherein said quality assurance system includes a capture device for capturing an interaction session between a screener and a subject.

21. The security identification system of claim 13, wherein said quality assurance system includes a training module selector for permitting quality assurance personnel to select a training module to be sent to a screener.

22. The security identification system of claim 21, wherein said screener may run said training module at said remote location.

23. The security identification system of claim 21, wherein said training module provides an interactive training session using said biometric data input device.

24. The security identification system of claim 13, wherein said known biometric data in said database includes data representations of one or both of:

a watchlist of persons to be identified; and a list of persons for identity verification.

25. A method of identifying and/or verifying the identity of a subject, said method comprising:

recording a transaction between a screener and the subject;

acquiring biometric data from the subject;

analyzing said biometric data and comparing it against known biometric data in a database;

determining whether a match exists with respect to said biometric data; and storing a data representation of the transaction for review by a quality assurance operator.

26. The method of claim 25, further comprising:

if a match exists with respect to said acquired biometric data, determining whether the match is a strong match; and involving expert analysts to assist in the analysis if the match is not a strong match.

27. The method of claim 25, further comprising:

collecting a claimed identity from the subject and retrieving previously stored biometric data from the database associated with the claimed identity.

28. The method of claim 25, further comprising:

providing an indication of whether the subject is cleared responsive to said acquired biometric data.

* * * * *